(12) United States Patent
Gannon

(10) Patent No.: US 9,852,234 B2
(45) Date of Patent: Dec. 26, 2017

(54) OPTIMIZING APPAREL COMBINATIONS

(71) Applicant: Brian Gannon, Atlanta, GA (US)

(72) Inventor: Brian Gannon, Atlanta, GA (US)

( * ) Notice: Subject to any disclaimer, the term of this patent is extended or adjusted under 35 U.S.C. 154(b) by 0 days.

(21) Appl. No.: 15/266,970

(22) Filed: Sep. 15, 2016

(65) Prior Publication Data

US 2017/0076011 A1 Mar. 16, 2017

Related U.S. Application Data

(60) Provisional application No. 62/219,644, filed on Sep. 16, 2015.

(51) Int. Cl.
*G06F 17/30* (2006.01)
*G06Q 30/06* (2012.01)
*G06Q 30/02* (2012.01)

(52) U.S. Cl.
CPC .. *G06F 17/30994* (2013.01); *G06F 17/30259* (2013.01); *G06F 17/30268* (2013.01); *G06F 17/30274* (2013.01); *G06F 17/30882* (2013.01); *G06Q 30/0224* (2013.01); *G06Q 30/0633* (2013.01)

(58) Field of Classification Search
CPC ........... G06Q 30/0224; G06Q 30/0601; G06Q 30/0631; G06F 17/30867; G06F 17/30259; G06F 17/30268; G06F 17/30274; G06F 17/30882; G06F 17/30994

USPC .......................... 707/733, 734, 707; 715/706
See application file for complete search history.

(56) References Cited

U.S. PATENT DOCUMENTS

| | | | |
|---|---|---|---|
| 2007/0168357 A1* | 7/2007 | Mo | G06Q 10/04 707/999.01 |
| 2010/0191770 A1* | 7/2010 | Cho | G06Q 30/02 707/783 |
| 2013/0215116 A1* | 8/2013 | Siddique | G06Q 30/0643 345/420 |
| 2013/0311511 A1* | 11/2013 | Peng | G06F 17/3087 707/769 |
| 2014/0249961 A1* | 9/2014 | Zagel | G06K 9/00369 345/634 |
| 2017/0024928 A1* | 1/2017 | Su muth | G06Q 30/0621 |

* cited by examiner

*Primary Examiner* — Vincent F Boccio
(74) *Attorney, Agent, or Firm* — Clayton, McKay & Bailey, PC

(57) ABSTRACT

A apparel optimization system can present digital representations of apparel items in a user's wardrobe or at a store on an avatar built to resemble the user. The avatar can be sized to resemble the user, and the apparel items can be superimposed on the avatar. The system can provide outfit recommendations to the user based on the user's wardrobe, and visually display the recommended apparel items on the user's avatar. The system can also include providing future purchase recommendations based on seasonal, trend, and wardrobe composition data.

19 Claims, 11 Drawing Sheets

OPTIMIZING APPAREL COMBINATIONS

PRIORITY CLAIM

This patent application is a non-provisional of U.S. patent application No. 62/219,644 ("System for Displaying Optimal Apparel Combinations"), filed Sep. 16, 2015, which is expressly incorporated by reference. This patent application claims benefit of priority to U.S. patent application No. 62/219,644.

BACKGROUND

Each day, every person must decide what they will wear. Choosing the right outfit involves choosing a combination of apparel that goes together stylistically and suits the occasion. Usually, this means the person will go through the closet and the dresser drawers hoping to find a workable combination, sifting through garments that no longer fit their body or style. Many people do not naturally have the ability to pick out optimal clothes for the day. This can be particularly true in the morning when their decision-making is suboptimal. Similar problems can exist when shopping for new clothes. The person might not appreciate which of two different apparel options best compliment their existing wardrobe.

Technological advances have generally been limited to helping users track what is in their closet. For example, U.S. Pat. No. 8,645,230 ("the '230 patent") describes a virtual closet system that stores and presents visual representations of items owned by a user. However, these existing technologies do not pick optimal clothing combinations or even significantly assist users in doing so. Instead, the user must still make all the decisions themselves, which often involves the same guess-work the user faces when staring into their wardrobe. As FIG. 2 of the '230 patent shows, the user still must sift through apparel items and imagine how they might fit together. The user is not aided in determining which apparel items will go best together on a given day, or apprised of needed upgrades to their wardrobe.

In view of at least the above shortcomings, a need exists for systems that display optimal apparel combinations.

SUMMARY

Example virtual closet systems are described herein. In one example, a system for displaying apparel can include a front-end application that executes on a user device in communication with a backend server system. The application can display an avatar that is based on size information of the user. The size information can come from a scan or picture of the user, or from aggregating sizes of apparel worn by the user.

The user can select an option to have the avatar display with one or more renderings of optimized apparel combinations. In one example, the system can select an optimized apparel combination from the user's existing apparel based on weighted factors that include geographic location, weather forecast, day of the week, calendar events, matching style and color combinations, and apparel usage history. The effectiveness or weight given to each apparel item for the factors can include aggregate votes or use combinations from other users who have the same or similar apparel item.

In one example, the user device can display multiple instances of the avatar, each instance with a different optimized apparel combination. This can allow the user to choose between multiple satisfactory options. In another example, the system can share the multiple instances with one or more voting users in the user's personal network. The voting users can select their favorite combination or otherwise score the optimized combinations. This can allow the users to receive human feedback on the optimized combinations The system can also recommend a new apparel item to the user in one example. The system can display the recommended new apparel item on the user's avatar as part of one or more optimized combinations based on the user's existing apparel. This can occur, for example when the user's average apparel rating, weighting, age, and/or usage for a category (such as shirt or shorts) falls below a threshold. Alternatively, it can occur when a user declines the optimized combination returned by the system a threshold percentage of the time. The new accessory can be selected by the system based on at least one of geographic location, season of the year, and matching combinations to a user's existing wardrobe apparel. The user can select the new apparel item on their avatar and be sent to an Internet location for purchasing the new apparel item.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DETAILED DESCRIPTION

Reference will now be made in detail to exemplary embodiments consistent with the invention, examples of which are illustrated in the accompanying drawings. Wherever possible, the same reference numbers will be used throughout the drawings to refer to the same or like parts.

Figure 1A:
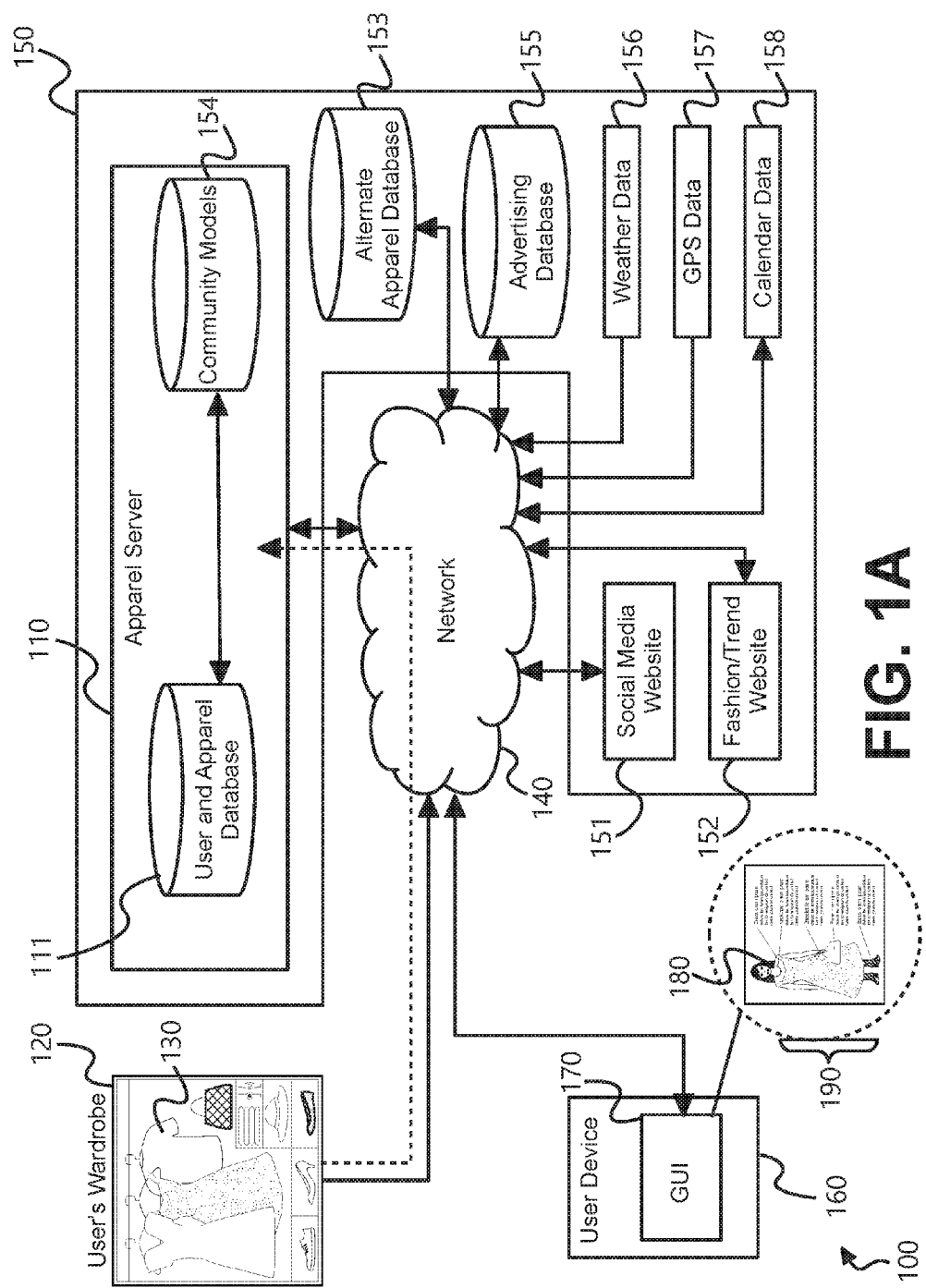
FIG. 1A depicts an overview of an exemplary virtual closet system consistent with an embodiment of the invention.

FIG. 1A shows an exemplary overview of a system that may be used to create a user avatar 180 that is capable of modeling digital representations of clothing articles. The clothing articles are a type of apparel item discussed herein. The system 100 can recommend an outfit for a user based on the clothing 130 that user owns or uses and visually show what the outfit (e.g., an optimized apparel combination) looks like on the user's avatar 180. The system 100 can further suggest potential clothing purchases based on wardrobe deficiencies, and display suggested new apparel on the avatar 180 as part of an optimized apparel combination that includes at least one apparel item that the user currently owns.

In an embodiment, system 100 can include an apparel server 110. Apparel server 110 can include a database 111 that stores user, apparel, and scoring data. In one example, database 111 can include multiple databases. The apparel server 110 may be connected to user devices 160 and/or other network services 150 via a communication network 140 such as the internet, a cellular or wireless network, a local area network ("LAN"), an enterprise wide area network ("WAN"), a workstation peer-to-peer network, a direct link network, or any other suitable communication channel.

Apparel items 130 can include clothing, undergarments, outerwear, jackets, shoes, footwear, hats, scarves, watches, jewelry, accessories, and other wearable articles. Apparel graphics and apparel description data for apparel items 130 may be stored in database 111 by the apparel server 110. A user device 160 can receive apparel graphics and description data from the apparel server 110. A front-end application (e.g., app or web browser) executing on the user device 160 can include a graphical user interface ("GUI") 170 for displaying representations of the apparel items 130 on an avatar 180 that resembles the user. For example, the GUI 170 can use the apparel graphics and description data to visually display a representation of the apparel item 130 being worn by the user avatar 180.

The user device 160 can be any computing device, such as a cell phone, laptop, tablet, personal computer, or workstation. The user device 160 can display an optimized apparel combination 190 based on their own wardrobe 120, as worn by their avatar 180.

The avatar 180 can incorporate a user facial image and have dimensions resembling those of the user. The system 100 can select the dimensions of the avatar based on the clothing sizes of apparel 130 in the user's wardrobe 120. For example, if the database 111 includes multiple pairs of pants with a particular length and waist size, the system 100 can size the lower body of the avatar 180 accordingly. Similarly, shirt sizes, and particularly dress shirts, can allow the system 100 to size the upper body of the avatar 180. The user can make adjustments in an example.

The apparel server 110 can be connected via a network 140 to other network services 150, including social media websites 151, websites dedicated to fashion and popular trends 152, source-provided 153 (e.g. clothing manufacturer, designer, or retailer) and community-provided 154 (i.e. enthusiast, user-generated content, or 3rd party) databases of apparel item 130 models, advertising databases 155, and data sources for weather forecasting 156, geolocation 157, and event/calendar 158 information. Descriptions herein pertaining to a "website," "database," or "application," also apply to other similar components, such as a traditional HTTP/S website; a web or network application; a cloud service; a mobile app; a locally-hosted application or data source; a data store, database, or subcomponent thereof (such as a database table); a peer-to-peer protocol; or, an RSS-style data feed.

System 100 can store personal and aggregate historical user data in Scoring database 111 for use by apparel server 110. Such data can be used, e.g., to assist system 100 in making outfit and purchase recommendations, to determine apparel purchase and use trends, to enhance the efficacy of product promotion systems, or undergird advertising programs. In an example consistent with an embodiment, system 100 can determine an optimized apparel combination based on user scores previously given to the same or similar combination.

A backend process can score the apparel items relative to each other. For each apparel item, a sample of usage data can be applied to determine relationships to other apparel items. The sample of usage data can be based on recency, with a cutoff date that can help ensure trends are captured. In one example, the cutoff date is one year, and only usage data more recent than that is considered. Each time usage data indicates that a first apparel item is worn by a user with a second apparel item, the score can be increased. When the usage data indicates common ownership of the two apparel items, the score can also be increased. In this way, each apparel item can be mapped to a series of related apparel items based on the sample usage data. The model and scoring can be periodically updated by the backend process, such as nightly.

Different scores can be generated for different geographic regions in one example. For example, the backend process can limit usage data to each particular region and score the relationships accordingly. Regions can be states, cities, countries, or any other geographic boundary.

The usage data can be received from multiple users. The front-end application 205 can receive user selections indicating which apparel items are owned. Daily, the front-end application can also track which apparel items are worn. In one example, the user selects the apparel items on the GUI 170 of the application 205 or accepts recommended apparel items on the GUI 170, indicating that they will be worn. In another example, the user takes a selfie and the application 205 recognizes the closest matching apparel items in the user's wardrobe, and counts those as used.

User database 111 may contain data describing apparel items 130 that each user owns. Each apparel item can include an apparel identifier. A user table can track which apparel each user owns by associating the apparel identifiers with user identifiers. The system 100 can additionally allow a user to remove or activate apparel to be considered in combinations by the apparel server 110. In an embodiment, the database 111 can store information regarding both currently and previously owned apparel items 130, in order to, e.g., keep a record of user tastes.

Additionally, the functions of one or more network services 150 may be aggregated or contained in one or more non-transitory computer-readable mediums. For example, apparel server 110 could utilize a single database for user historical usage data, scoring, apparel, event calendar 158; brand-supplied models 153 and community models 154 provided apparel item 130 information; and, data stores of advertising 155 content. Conversely, apparel server 110 may interact with multiple network services 150 with e.g. many hundreds of clothing designers and retailers maintaining individual source apparel databases 153 that contain only apparel item 130 models for their own merchandise.

Figure 1B:
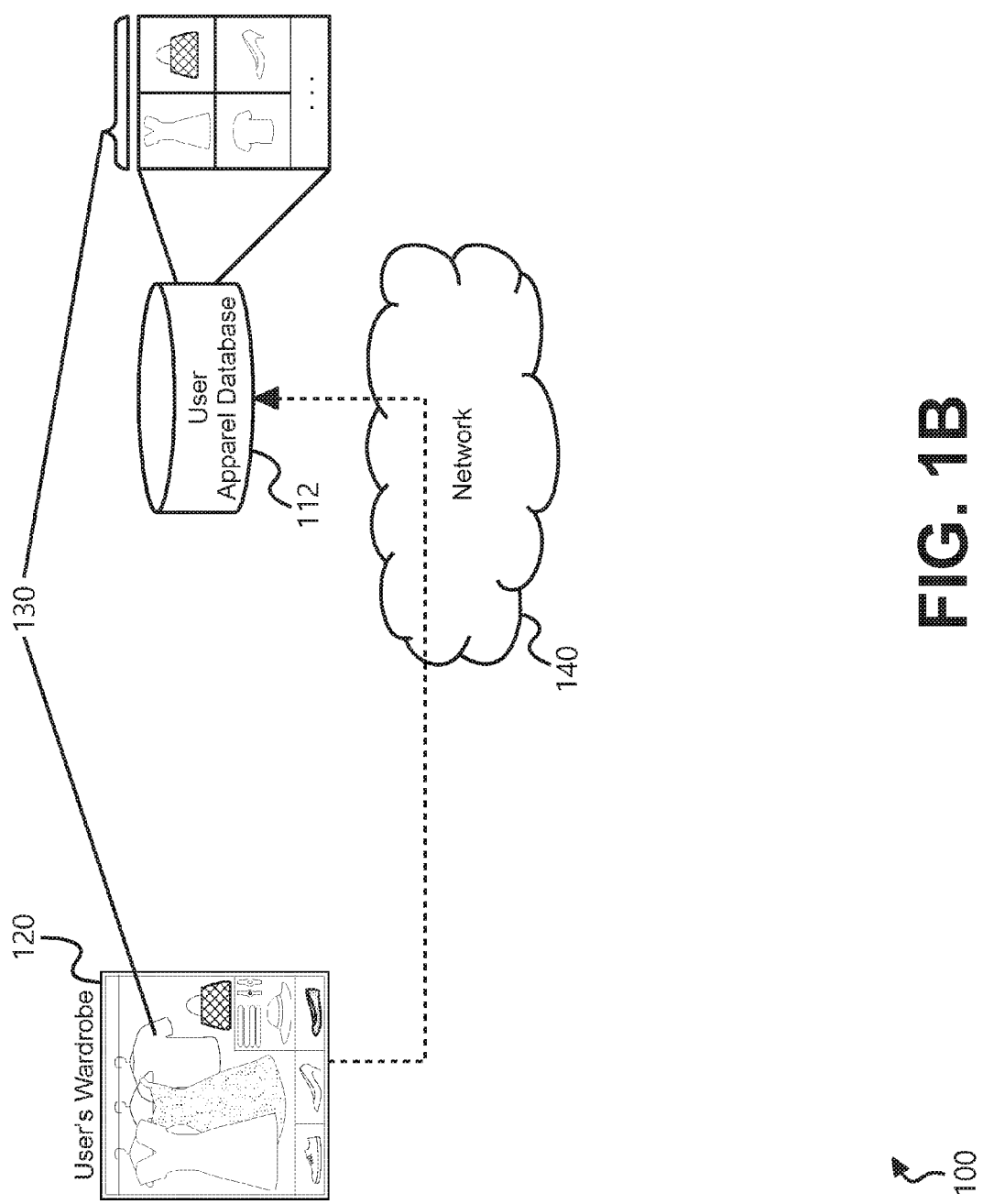
FIG. 1B depicts an overview of an exemplary virtual closet system consistent with an embodiment of the invention.

FIG. 1B illustrates an exemplary overview of a virtual closet system 100.

In an example, representations of the apparel items 130 contained in a user's wardrobe 120 are stored in the database 111. In one aspect, a user may transmit wardrobe information over a network 140 to the user apparel database 111. In another aspect, a user may select, from data sources available over a network 140 (e.g. a manufacturer's database of models) apparel items 130 for inclusion in database 111 to accurately reflect the contents of the user's wardrobe 120.

In one example, a system limits recommended apparel items to a particular manufacturer or retailer. The apparel items can be stored in the database with reference to a retailer or manufacturer. The backend process can limit apparel recommendation to those apparel items associated with the manufacturer or retailer. In one example, the system checks inventory of the retailer or manufacturer before making a recommendation. This can include checking particular apparel items, such as POLO shirts, and particular colors that are inventory. The system can limit recommendation to a particular retailer or manufacturer. This can allow the retailer or manufacturer to implement the system in a store, such as for a registry or general shopping.

Further, the system can aggregate user selections by retailer or manufacturer to see which of the apparel items users prefer. This can provide retailers or manufacturers with targeted data as to what consumers own and want to own their items (e.g., based on shopping activity with avatar and/or items selected for a registry or desires page). In one example, the system provides highly valuable data that can be used to better target customers.

Based on the data for registry or desires data can be used by other users or consumers to purchase for a user and to determine trends based on what people are listing in such registry or desires page. The registry or desires data can also be used to determine a user's preferences or taste.

Figure 2:
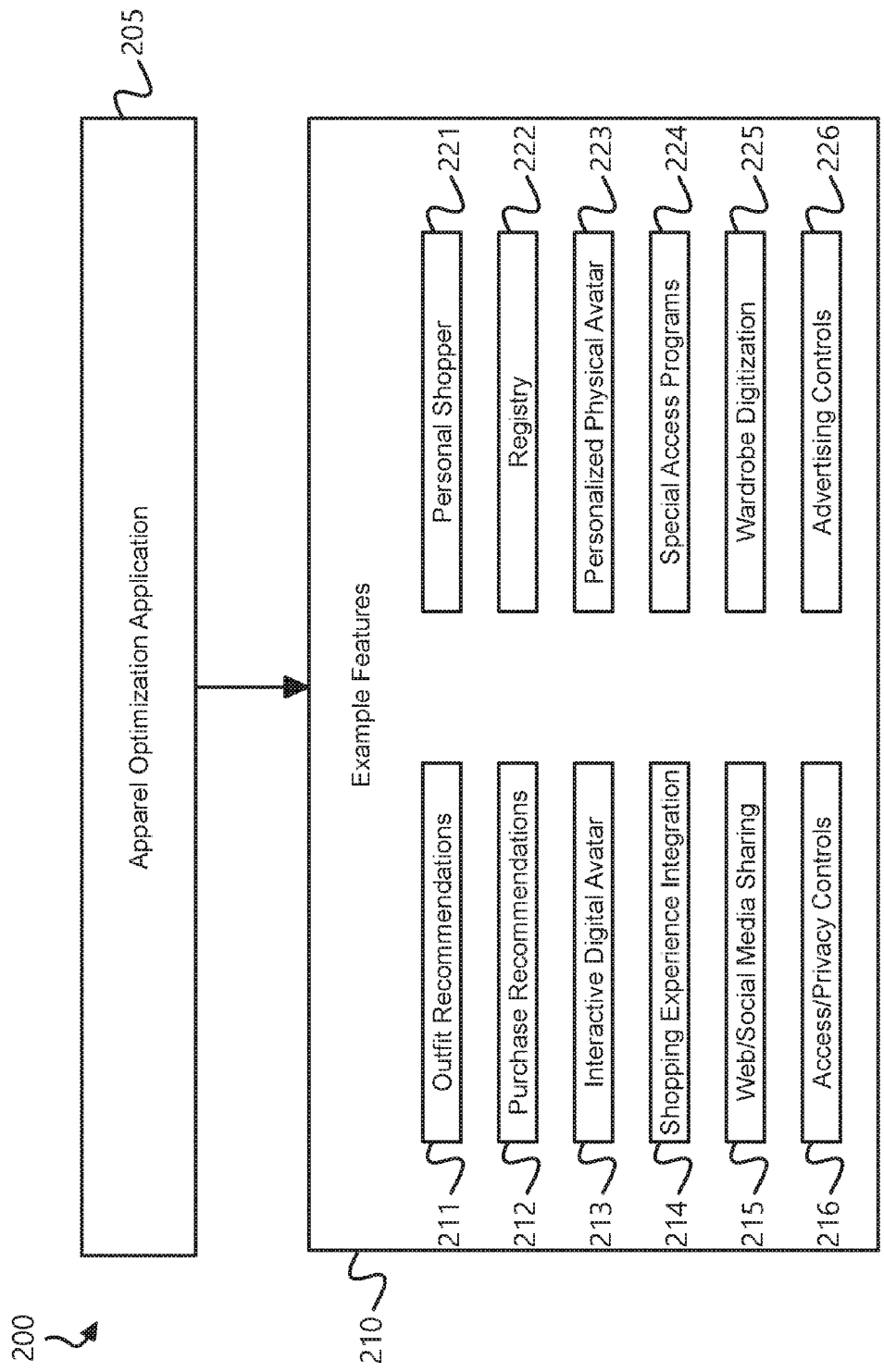
FIG. 2 depicts an overview of exemplary virtual closet system feature sets consistent with an embodiment of the invention.

Referring now to FIG. 2, there is shown an overview of exemplary feature sets 200 of a system 100 consistent with an embodiment. An apparel optimization application 205 can include a front-end that is executed by a processor at each user device 160 and a back-end that is executed by a processor at the apparel server 110.

The application 205 can have a set of features 210. The features 210 can include, for example, the capability to recommend outfits 211 and apparel purchases 212, and an interactive digital avatar 213 that can visually display apparel items 130. Features can also include shopping experience integration 214 with online retailers and brick and mortar retailers.

Graphical renderings of an apparel item on the user's avatar can be associated with a URL such that the user can select the apparel item and be directed to an online store to purchase the item. Additionally, physical apparel tags may be scanned by the user device to associate an apparel item with the user at the apparel server 110. Shopping experience integration 214 can also include using the database 111 as a basis for a gift registry 222.

Other features can include social media sharing 215 capabilities that allow users to share multiple avatars with different outfit combinations. This can allow other users to post, score, or vote on outfits. The system 100 can adjust weighting of stylistic matches based on scores or votes from the user's friends in one embodiment.

The friends that receive the optimal apparel items for voting purposes can be limited based on access settings for the apparel items. Each apparel item can be assigned to an access group in one example. For example, the group that votes on casual wear can be different than the group that votes on formal wear.

In one example, the system provides different levels of access to different contacts and friends. Some users can only see registry page others can see full closet or wardrobe of the user.

In one example, the system gives third party service providers limited access to a user's wardrobe to enhance the third party's ability to provide services. In one example, a personal shopper user can be given limited access to a first user's wardrobe so they can help the first user shop for additional apparel item.

In one example, the system can allow manufacturers or retailers to access system to provide their data. In one example, the system can provide an API for third parties to supply data for representing apparel items with high quality images. In one example, an apparel item has graphics (e.g., a picture and data received from manufacturer or retailer) that are received when a user scans a barcode a physical item. In one example, the system stores digital images that are retrieved based on an apparel item identifier, such as a barcode. In another example, the user can provide an image of an apparel item by taking a picture.

Additional features of application 205 can include making a one-time or subscription payment, making apparel purchases through the front-end or back-end portion of application 205, receiving an invitation from an administrator or another user, sharing additional information, maintaining activity above a threshold, or participating in certain programs. Further features can include, for example, the use of personal shoppers 221 or extensive professional wardrobe advice. Features can also include the ability to customize the interface 225 (e.g. to resemble the user's own closet), to limit or control advertising 226, or to participate in special access (e.g. retailer loyalty or coupon) programs 224.

A registry feature 222 can allow the user to set up a registry based on their avatar and stored wardrobe records. In an example, the registry can supply the user's avatar and wardrobe to users who are shopping for registry gifts for the user. The user can specify a level of access for other users in one embodiment. For example, the access can include everyday clothing but exclude undergarments, lingerie, and other apparel that the user may not want other users to access. In a further embodiment, the user can set access privileges to highlight a subset of apparel that the user would like to use as a basis for additional outfits. In this way, a friend or other shopper can start with the avatar and a selected apparel item that the user already knows, and receive optimized recommendations for secondary apparel items that coordinate with the first apparel item to form an outfit. The secondary apparel items can be pulled from third party databases, such as for online stores where the user is registered. The secondary apparel items can also come from virtual closets of friends, who could potentially save money by gifting clothing that they no longer use.

The registry can also be updated in real time, such that when a friend purchases an apparel item for the user, that apparel item can be used as a basis for an additional optimized apparel combination. A second friend at a different location can select the new apparel item that the user may not have physically received yet, and the system can recommend an optimized apparel combination based on the new apparel item and items for sale at a particular store. The second friend can visualize the combinations on the user's avatar on their own mobile device.

Recommendations for creating an optimized apparel combination can be printed in one example. This can allow a friend to print a custom registry based on the user's one or more favorite apparel items. Stores can also display a digital image of the avatar in store with retailer's clothes to help the user consider many options before limiting apparel item selections in an example. The system can track which items the user tries on in one example, and can solicit friend votes on a social network. This can include displaying two or more instances of the avatar with different apparel items for friends to vote on.

In another example, the system can allow multiple users to purchase or trade apparel with one another. The system can determine that a subset of apparel items in a first user's wardrobe fall below a threshold level of usage. The system can designate those items as available. The system can perform the same calculations for a plurality of other users, including a second user. Then, the system can determine whether any of the subset items of the second user could create an optimal apparel combination with items above the usage threshold in the first user's wardrobe. The system will also perform the reverse analysis to determine which of the first user's subset could form an optimized apparel combination with the second user's apparel. If at least one determination can be made in both directions, the system can propose an apparel trade.

Similarly, users can designate values to their subset apparel items. This can allow for value equivalent trades, of for a first user to purchase a subset apparel item from the second user. This can facilitate a streamlined used clothing exchange between users in one example.

In one example, the system 100 can send the user's avatar 180 to include a service that 3-D prints the user's avatar 180. A clothing seller can place physical clothing items onto the physical avatar for the user to review remotely or in person. This can allow the user to send their avatar to a store at a remote location, where the store can print the avatar in life-size proportions and visually show the user how a physical apparel item would look. It also can allow a company to create custom clothing based on the avatar dimensions matching those of the user. The company can ensure the custom clothing fits before shipping the final clothing pieces to the user.

Figure 3:
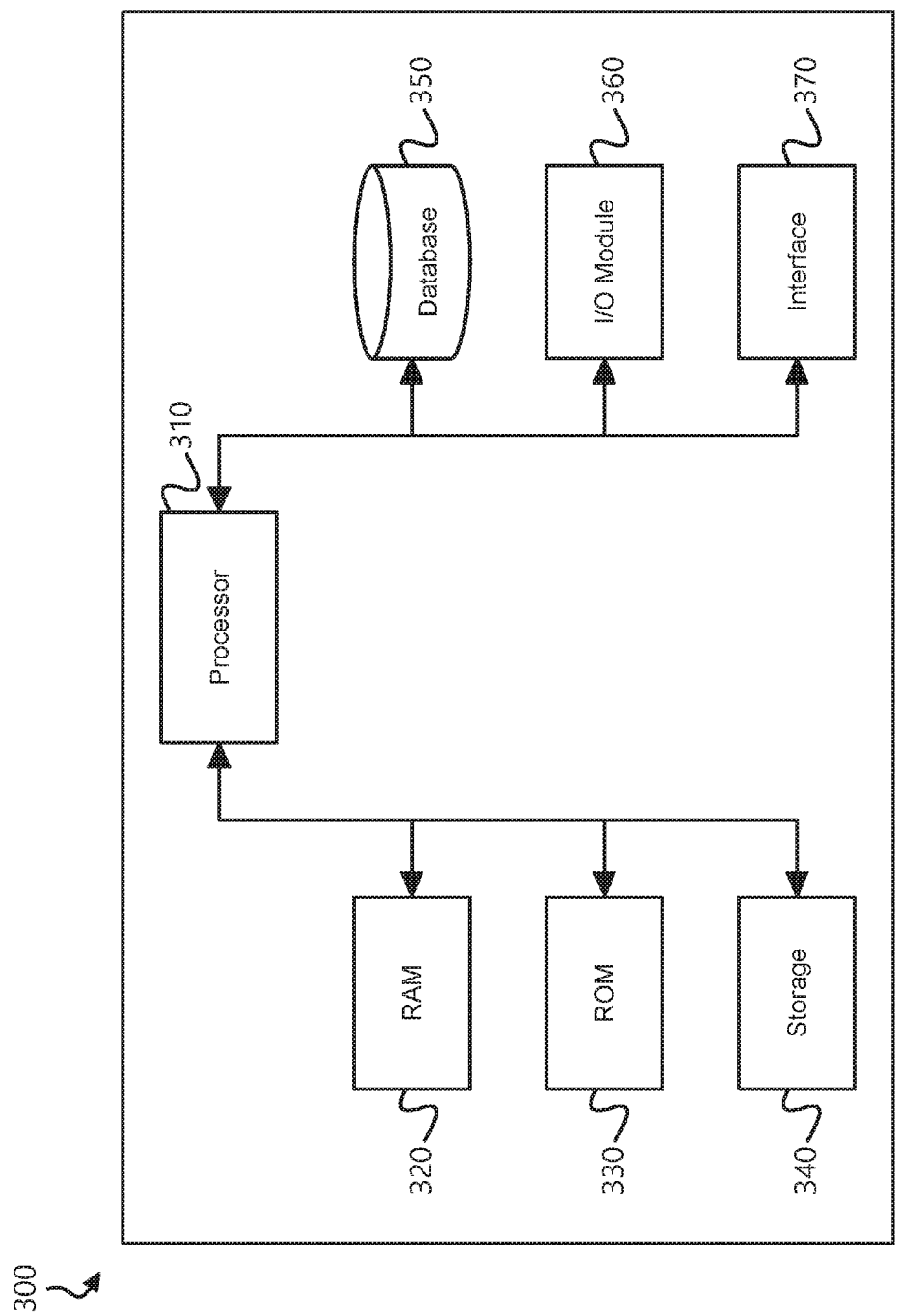
FIG. 3 depicts an exemplary computer system capable of carrying out the processes of a virtual closet system consistent with an embodiment of the invention.

FIG. 3 illustrates processor-based computing system 300 representative of the type of computing system that can be present in or used in conjunction with the apparel server 110 or user device 160 of system 100.

For example, a processor-based computing system 300 can be used in conjunction with any one or more of transmitting signals to and from components of a virtual closet system 100, processing received signals, and storing, transmitting, or displaying information. The depicted computing system 300 is illustrative only and does not exclude the possibility of another processor- or controller-based system being used in or with any of the aforementioned aspects of a virtual closet system 100.

In one aspect, computing system 300 can include one or more hardware and/or software components configured to execute software programs, such as software for storing, processing, and analyzing data. For example, a computing system 300 may include one or more hardware components such as, for example, a processor 310, a random access memory ("RAM") module 320, a read-only memory ("ROM") module 330, a storage system 340, a database 350, one or more input/output ("I/O") modules 360, and an interface module 370.

Alternatively and/or additionally, computing system 300 can include one or more software components such as, for example, a computer-readable medium including computer-executable instructions for performing methods consistent with certain disclosed embodiments. It is contemplated that one or more of the hardware components listed above may be implemented using software. For example, storage 340 can include a software partition associated with one or more other hardware components of computing system 300. Computing system 300 can include additional, fewer, and/or different components than those listed above. It is understood that the components listed above are illustrative only and not intended to be limiting or exclude suitable alternatives or additional components.

Processor 310 can include one or more processors, each configured to execute instructions (in, for example, one or more computing "threads") and process data to perform one or more functions associated with computing system 300. The term "processor," as generally used herein, refers to any logic processing unit, such as one or more central processing units ("CPUs"), digital signal processors ("DSPs"), application specific integrated circuits ("ASICs"), field programmable gate arrays ("FPGAs"), and similar devices.

As illustrated in FIG. 3, processor 310 may be communicatively coupled to RAM 320, ROM 330, storage 340, database 350, I/O module 360, and interface module 370. Processor 310 can be configured to execute sequences of computer program instructions to perform various processes, which will be described in detail below. The computer program instructions can be loaded into RAM 320 for execution by processor 310.

RAM 320 and ROM 330 may each include one or more devices for storing information associated with an operation of computing system 300 and/or processor 310. For example, ROM 330 may include a memory device configured to access and store information associated with computing system 300, including information for identifying, initializing, and monitoring the operation of one or more components and subsystems of computing system 300. RAM 320 may include a memory device for storing data associated with one or more operations of processor 310. For example, ROM 330 may load instructions into RAM 320 for execution by processor 310.

Storage 340 can include any type of storage device configured to store information that processor 310 needs to perform processes consistent with the disclosed embodiments.

Database 350 may include one or more software and/or hardware components that cooperate to store, organize, sort, filter, and/or arrange data used by computing system 300 and/or processor 310. For example, database 350 may include individual and aggregated historical usage data, apparel item 130 models, user avatars 180, and individual users' wardrobe data. Alternatively, database 350 may store additional and/or different information.

I/O module 360 may include one or more components configured to communicate information with a user associated with computing system 300. For example, I/O module 360 may comprise one or more buttons, switches, touchscreens, or microphones to allow a user to input parameters associated with computing system 300. I/O module 360 can also include a display including a graphical user interface ("GUI") and/or one or more light sources for outputting information to the user. I/O module 360 can also include one or more communication channels for connecting computing system 300 to one or more peripheral devices such as, for example, a printer, user-accessible disk drive (e.g., a USB port, floppy, CD-ROM, or DVD-ROM drive, etc.), microphone, speaker system, or any other suitable type of interface device.

Interface 370 can include one or more components configured to transmit and receive data via a communication network, such as the internet, a cellular or wireless network, a LAN, an enterprise WAN, a workstation peer-to-peer network, a direct link network, or any other suitable communication channel. For example, interface 370 may include one or more modulators, demodulators, multiplexers, demultiplexers, network communication devices, wireless devices, antennas, modems, and any other type of device configured to enable data communication via a communication network.

Figure 4:
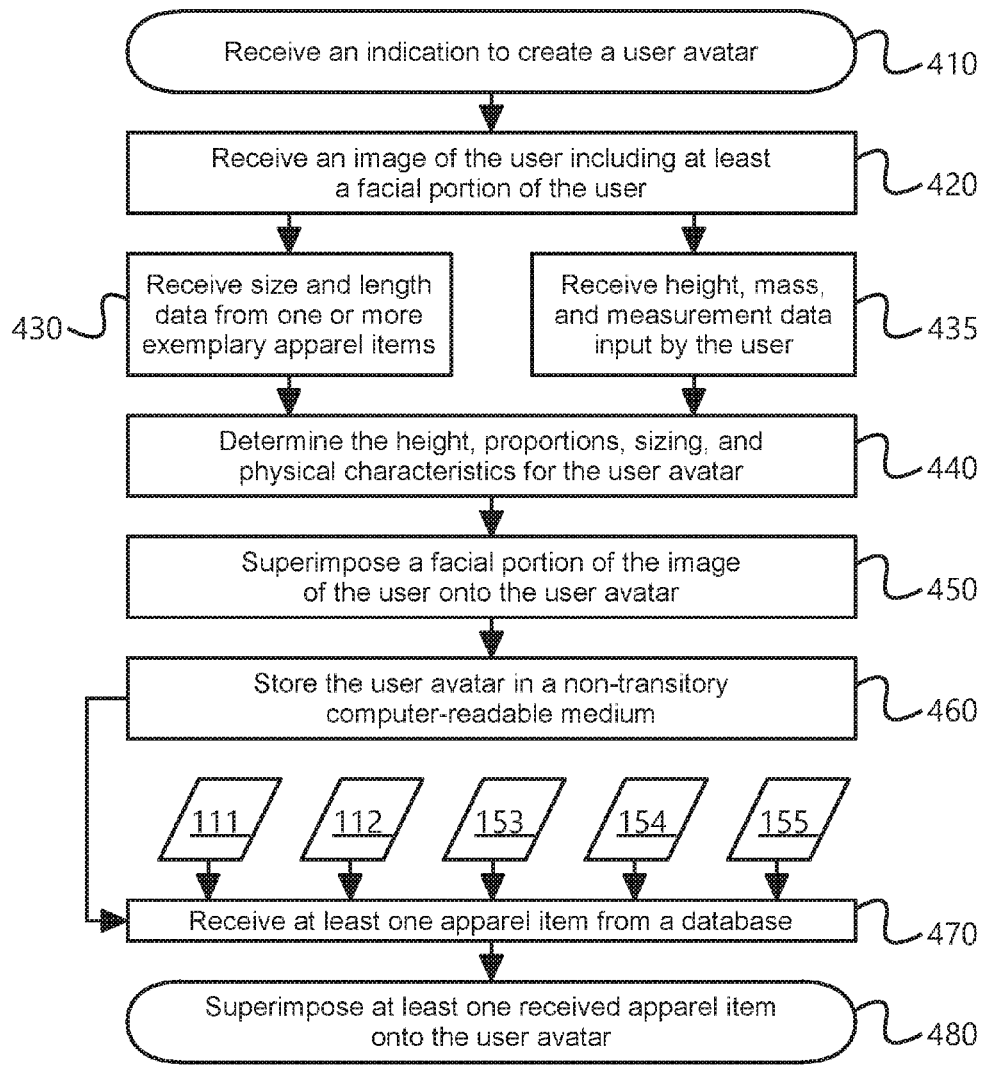
FIG. 4 depicts an exemplary method for using a virtual closet system, in accordance with an embodiment.

Referring now to FIG. 4, there is shown an exemplary method 400 for creating a user avatar 180 in a virtual closet system 100 consistent with an embodiment. By creating a realistic avatar 180 that mimics the actual look of the user, the system 100 may provide a more effective medium for outfit comparison or apparel evaluation.

In an embodiment, apparel server 110 can be used to create a user avatar 180 for a user, based on one or more images of the user and data about the physical characteristics of the user.

At step 410, system 100 can receive an indication to create a user avatar 180. An indication may come from the user explicitly selecting an option on GUI 170 to create an avatar 180. Alternatively, an indication may be triggered or issued from the application 205. For example, the apparel server 110 can determine that the avatar is old or that the apparel items in the wardrobe include a threshold percentage of sizes that do not match the avatar 180. The apparel server 110 can also recognize a new user without an existing avatar 180, and provide the indication to create the user avatar 180.

At step 420, system 100 can receive an image of the user, including at least a facial portion of the user. This image may be taken by the user directly on the user device 160. The image may be, e.g., one or more ordinary digital images (in the form of headshots and/or full body shots), a composite of multiple pictures, a stylized digital representation of the user, or a representation generated by 3-D scanning/sensing capabilities of the user device 160. For example, the user device can be a walk-in scanner in one example. The user can stand within the scanner, such as a retail location, and a 3-D scan can be performed. The 3-D scanner can use a built-in reference point since it surrounds the user and scans a fixed area.

In another example, the user provides (e.g. uploads, selects local copies of, or indicates a network addresses of) one or more existing images of the user to the apparel server 110. Alternatively, application 205 can cause the user device 160 to use its photograph module to take a picture of the user. In so doing, application 205 may provide guidance through the GUI 170 directing the user to a preferred orientation with respect to the photograph module. As discussed below, this can include directing the user to hold a reference object, such as a sheet of paper, or hang a reference object around the user's neck.

Either or both of steps 430 and 435 may follow step 420. At step 430, system 100 (e.g., at apparel server 110) determines size and length data from apparel data associated with the user in database 111. This step can be accomplished by the user manually entering the measurements of at least one exemplar from the user's own wardrobe 120. This step could also be accomplished by, e.g., scanning a code that corresponds to a product identifier for which there exists measurement data in the database 111 or another database.

At step 435, system 100 can receive height, mass, and measurement data input by the user. This step can be accomplished by the user manually entering their height and weight, along with waist, shoulder and neck measurements. Alternatively, a user device 160, the application 205, or another network service 150 may have the capability to ascertain one or more of these measurements from size information for apparel items stored in database 111.

At step 440, system 100 can determine the height, proportions, sizing, and physical characteristics for the user avatar 180. System 100 may base this determination on information received in one or more of steps 420, 430, and 435. For example, application 205 may approximate the user's physical features by combining manually entered height and weight information with data from source apparel databases 153 on exemplary jacket, shirt, and pant sizes, and further refine the avatar 180 with image data from full-body pictures of the user that more subtly reflect the user's body shape.

In one example, the picture of a user or the user's aggregated size data from apparel items in the user's wardrobe. In another example, sizing data for the avatar can come from measurements from tailors or self-measurements.

In another example, the system can base step 440 at least in part on a photo taken of the user. The user can hold a reference object, such as a sheet of paper, that the system is pre-programmed to know the dimensions of. The system can measure the object to dimension conversion reference within the image. This can allow the system to accurately size the head, torso, waist, arms, and legs of the avatar based on a photo of the user.

At step 450, system 100 can superimpose a facial portion of the image of the user onto the user avatar 180. As described in step 420, the image may be as simple as a single headshot or as sophisticated as a 3-D representation of the user's face and head. This step can be accomplished by applying (as by fitting, wrapping, or algorithmically adapting) the facial portion of the image to the facial area of the avatar 180, such that the avatar 180 resembles the user in the appearance of both the body characteristics and the face. The system can identify the face in a photo, and utilize the face portion of the photo as a graphical texture on the facial region of the avatar in an example.

In another example, the avatar 180 is a mannequin that remains faceless.

At step 460, system 100 can store the user avatar 180 in a non-transitory computer-readable medium. This can be accomplished by storing a digital file representing the avatar 180 in a storage module 340 or database 350, locally on a user device 160 or remotely on apparel server 110.

At step 470, system 100 can receive at least one apparel item 130 from a database. This step can be performed by receiving an apparel item 130 model from one of a variety of sources, such as the database 111, an alternate source (e.g. retailer) apparel database 153, a community apparel model database 154, or an advertising database 155.

For example, system 100 can receive one or more articles that already exist in the user's wardrobe 120, along with "aspirational" items received from manufacturer and advertising sources to complement the user's items. In one aspect, an apparel item 130 can be a generic model (e.g. a plain, featureless, unisex undergarment) received from the database 111 or programmed into in the application 205 as an always-available baseline apparel item 130.

At step 480, system 100 superimposes (or otherwise displays) a received apparel item 130 on the user avatar 180.

Figure 5:
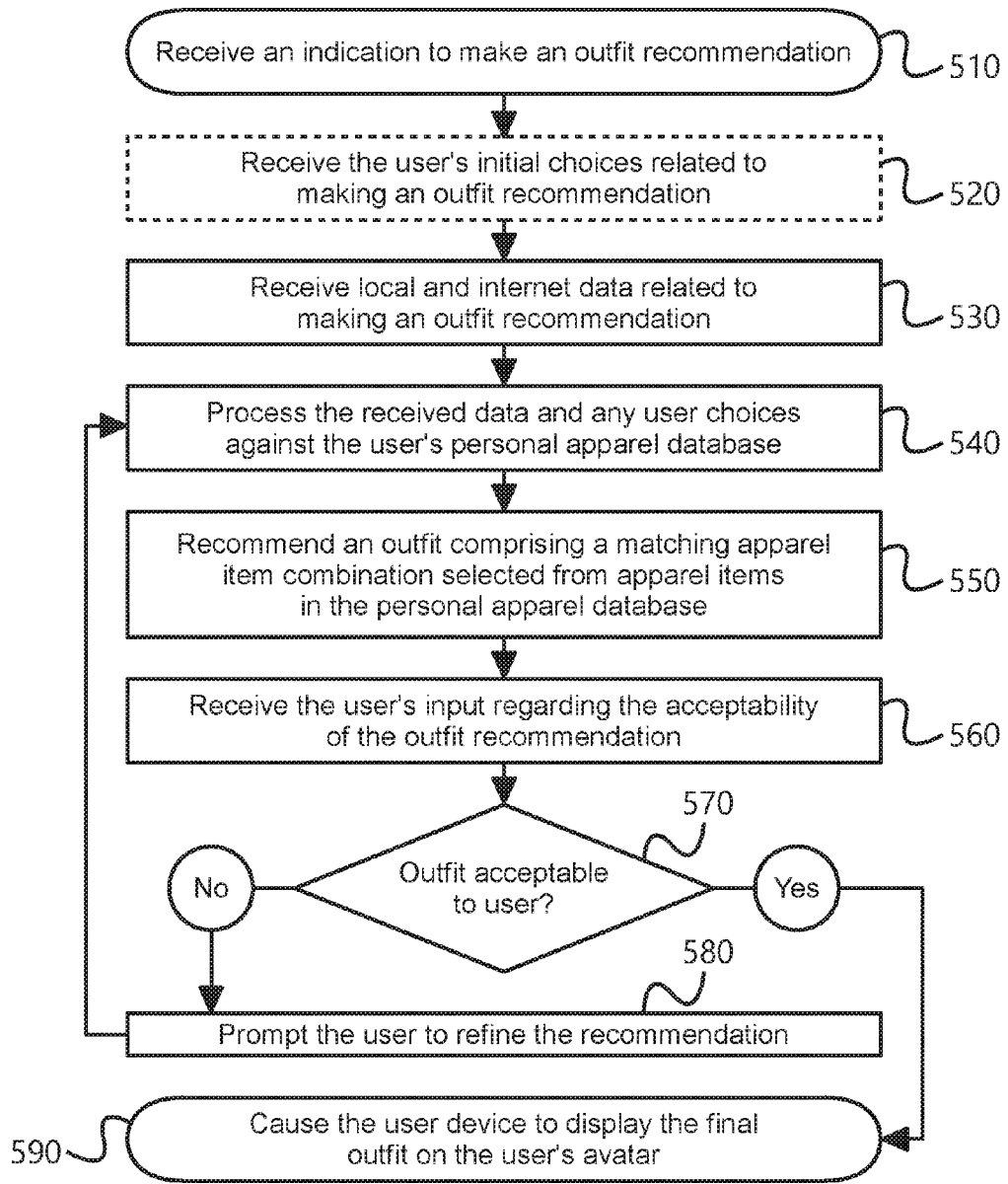
FIG. 5 depicts an exemplary method for using a virtual closet system, in accordance with an embodiment.

Referring now to FIG. 5, there is shown an exemplary method 500 for making an outfit recommendation consistent with an embodiment. In an embodiment, system 100 can have the capability to make an outfit recommendation, comprising a matching apparel item combination 190 selected from apparel items 130 extant in the user's wardrobe 120. The recommendation can be based on factors like the current season and weather forecast in the user's locale, color-matching, style rules, historical usage patterns, calendar information (e.g., client meeting vs. pool party), social media scores and trends, and the user's own input.

System 100 may retrieve apparel information from database 111 for use in determining one or more optimized apparel combinations. The user may then decide, based on each outfit visually presented on the GUI 170, whether to alter, keep, or dismiss combinations or individual apparel items. Arriving at an acceptable optimized apparel combination, system 100 may then present the final outfit on the user avatar 180.

At step 510, system 100 can receive an indication to make an outfit recommendation. An indication may come from the user explicitly directing the apparel server 110 to make an outfit recommendation. Alternatively, an indication may be triggered or issued from within the application 205 when, for example, a user sets recurring outfit recommendations to be made automatically at scheduled intervals (e.g. every weekday morning at 7 AM).

At step 520, system 100 optionally receives initial choices the user makes. The user may manually input a target setting, target style, color pallet, or selecting an initial apparel item 130 around which to base the recommendation.

As an example, a user can indicate a potential purchase as an initial choice, in order to see how that item meshes with the user's existing wardrobe 120. A user can use a mobile device to scan a QR (or similar) code that acts as a product identifier for an as-yet-unpurchased apparel item 130 that the user is contemplating purchasing (e.g. a tagged article on a store rack). System 100 may then correlate that product identifier with apparel in a database, such as database 111. The user can then direct system 100 to use the unpurchased item as the basis of one or more outfit recommendations (e.g., optimized apparel combinations) comprising that item together with items from the user's wardrobe 120, ultimately displaying one or more potential matching apparel item combinations 190 of the user's clothing with the potential purchase.

At step 530, system 100 can receive local and internet data related to making an outfit recommendation, such as aggregate and personal historical usage data, weather conditions, popular trends, color, and style rules. Such data can be received by apparel server 110 or application 205 (remotely or locally) from, e.g., one of many network services 150, the database 111, a user device 160, or other sources such as computer readable media or scannable codes. In another example, a chip, such as an RFID chip, can emit a signal that the user's mobile device can receive and translate into an apparel identifier. Using the apparel identifier, the system can then retrieve a model from a database.

For example, in the process of making an outfit recommendation, system 100 can gather weather data 156 from a national weather RSS feed. In one example, the user device pulls the weather data based on URLs supplied in the application 205. Each apparel item can have a weighting factor for one or more ranges of temperatures, chances of rain, and chances of snow. For example, if the weather forecast calls for a high in the 50s, weighting factors can be higher for a long-sleeve shirt or sweater than for a short-sleeve shirt. If weather calls for rain or snow, then boots can be weighted highly while sandals can be negatively weighted.

The system 100 can also use user calendar data 158, such as from the user's calendar. The calendar data can be pulled by setting up the application 205 to communicate with the user's calendar application. Alternatively or in addition, the system 100 can receive user calendar information from a cloud-based scheduling application (to which the user has granted system 100 access).

The calendar information can indicate events, such as a work meeting. This can cause the system 100 to weight formal attire and/or business casual attire highly, while devaluing casual styles or inappropriate styles such as rocker or punk. The calendar can also cause the system 100 to recommend a spare change of clothes when the calendar indicates multiple event types on a single day.

The system 100 can also utilize color and style rules from database 111 to determine which of the apparel items in the user's existing wardrobe 120 can go together. Style information can be broken into a plurality of categories, with each category having a rating with respect to a particular apparel item. Style categories can include formal, business casual, casual, modern, traditional, alternative, western, city, preppy, hipster, high school, bohemian, artsy, chic, classic, exotic, conservative, flamboyant, glamorous, romantic, sexy, sophisticated, punk, tomboy, rocker, goth, and others. Some style categories can be combination categories in an example. For example, punk can include at least one hipster apparel item and a rocker apparel item. An apparel item can have a score from 0 to 100 in each category in one example.

In one example, the style scores can be used to weight apparel relationship scores based on usage data. For example, if two apparel items have a similar style score, the relationship score between the two items can be increased. Conversely, disparate style scores can be used to decrease the scored relationship of the two apparel items.

Color rules can compare dominant and secondary color values for each apparel item. In one example, colors having a threshold similarity are considered a match. A second threshold can be used to determine color clashes. A third threshold can be used to determine complementary colors.

The system 100 can use avatar information from the database 111 to display the avatar on user device 160. The system 100 can further use data on a newly purchased pair of shoes from a QR code on the shoebox, and models for apparel items 130 from partner manufacturer source apparel databases 153.

At step 540, system 100 can process the received data and any user choices against the stored apparel information for the user. This step can be accomplished by performing one or more weightings of the user's wardrobe 120 based on the various criteria and received data. In this step, system 100 might weight apparel items 130 in the user's wardrobe 120 for, e.g., color-compatible casualwear, winter-appropriate business outfits, dresses and accessories that go with a certain pair of shoes, etc. System 100 might then rank, include, exclude, or combine items based on the one or more weightings.

At step 550, system 100 can recommend an outfit comprising a matching apparel item combination 190 selected from apparel items 130 in the database 111. In one embodiment, an outfit recommendation can be a highest-weighted potential matching apparel item combination 190 as determined in step 540. In another embodiment, an outfit recommendation can be one combination (or a single appropriate article) out of the subset that exceeds a weighting threshold.

At step 560, system 100 can receive the user's input regarding the acceptability of the outfit recommendation. This step can be accomplished by, for example, allowing the user a "thumbs up" or "thumbs down" for a recommendation, allowing the user to rank multiple recommendations, or allowing the user to base a decision on the input (e.g. voting) of other users. If a recommended outfit is acceptable to the user 570, system 100 may proceed to step 590. If not 570, system 100 proceeds to step 580.

At step 580, system 100 can prompt the user for input on how to refine or improve the recommendation. This step can be accomplished by, e.g., receiving user input keeping, changing, or dismissing an apparel item 130, altering the color palette, or altering the target style. System 100 then returns to step 540 and begins the process anew of making an outfit recommendation, including the new user input in the process.

At step 590, system 100 can cause the user device 160 to display a final outfit of one or more apparel items 130 on the user's avatar 180.

Figure 6A:
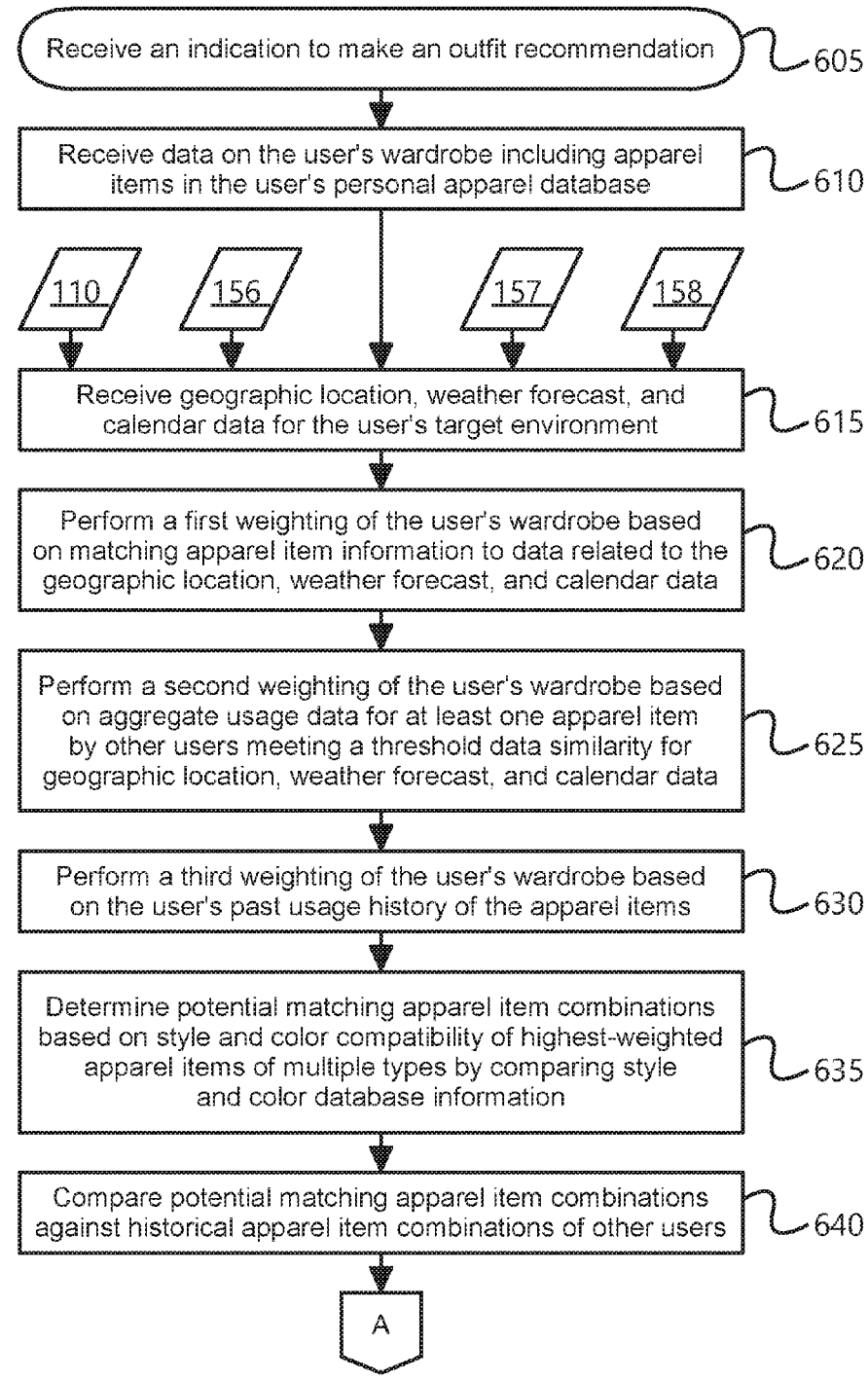
FIG. 6A depicts an exemplary method for using a virtual closet system, in accordance with an embodiment.
Figure 6B:
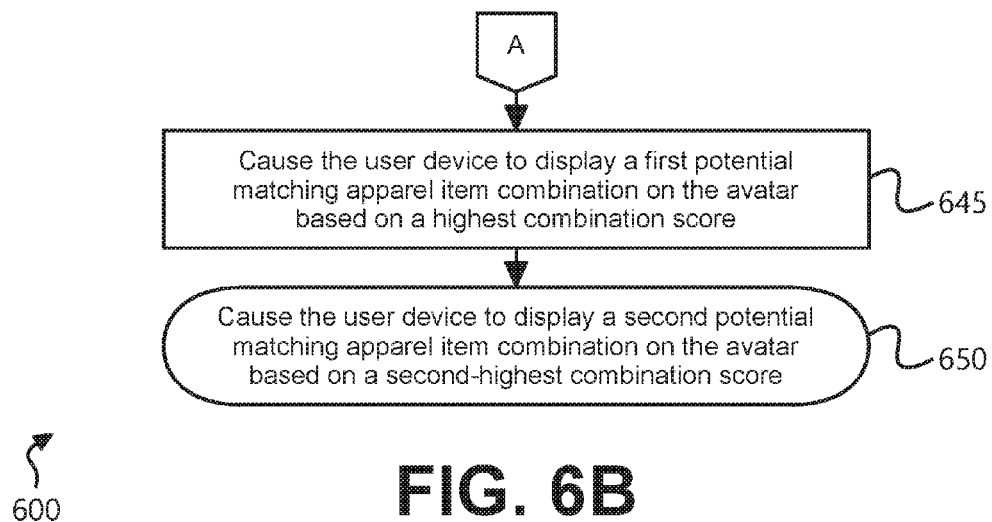
FIG. 6B depicts an exemplary method for using a virtual closet system, in accordance with an embodiment.

Referring now to FIGS. 6A-B, there is shown an exemplary method 600 for making an outfit recommendation consistent with an embodiment. The system 100 can make an outfit recommendation by performing one or more weightings of the contents of a user's wardrobe 120, based on, e.g., color and style rules, weather conditions, season, calendar events, and past usage.

In one aspect, system 100 can locate apparel items associated with the user in database 111. The system can determine aggregate usage data of other users (from, e.g., database 111) for the same or similar apparel items. The system can weight aggregate usage data more highly when another user is located in a similar geographic location as the user's location 157. Additionally, historical usage data can be stored with regard to historical weather forecasts. Therefore, forecasted weather 156 for the location can also cause the system 100 to weight the impact of the historical usage information.

Calendar information 158 stored at the user device 160 or elsewhere can further influence environmental weighting. For example, the day of the week could indicate a more casual or formal attire. Specific calendar events, such as a pool party, work meeting, client meeting, or others can also impact a formal attire calculation. If the formal attire calculation exceeds a threshold, then the system 100 can rule out certain apparel styles. Other (e.g., more formal) styles can be weighted highly.

In one example, system 100 may then the user's apparel first for climate- and event-appropriateness, next for apparel item 130 choices other similarly-situated users have made, and finally for the user's own historical apparel item choices. System 100 may then determine matching apparel item combinations 190 out of the weighted items by applying color and style rules, as well as data on combinations that are popular with other similarly situated users.

Alternatively, or in addition, system 100 may weight the user's wardrobe 120 using more, fewer, or different data sets than described above, or in a different order, or assign the weights in different ways. For example, system 100 may be capable of first determining appropriate potential apparel item combinations 190 (i.e. one or more articles of clothing that could go together, like wool winter suit pants and jacket) given weather and event data, and then perform one or more weightings based on the individual's and others' historical choice patterns.

For another example, system 100 can also include a weighting step that incorporated social media website 151 data from similarly situated users, and the potential for the user to provide feedback on the weights accorded to various other users. For example, high scores or up votes given by users that are friends with the user can be given weight. Additionally, high scores or up votes by complete strangers that have similar voting history, age, and geographic considerations as the user may be weighted highly.

In another example, the user can indicate one or more apparel items 130 as "must-include" articles. The system 100 can attempt to match the selected apparel with other items, using any of the methods described herein.

At step 605, system 100 can receive an indication to make an outfit recommendation. At step 610, system 100 can receive data on the user's wardrobe 120 including apparel items 130 in the database 111.

At step 615, system 100 can receive geographic location 157, weather forecast 156, and calendar data 158. This step can be accomplished by interacting with various network services 150 that possess this information, or some or all of it may be retrieved by the application 205, apparel server 110, or database 111.

At step 620, system 100 can perform a first weighting of the user's wardrobe 120 based on matching apparel item 130 information to data related to the geographic location 157, weather forecast 156, and calendar data 158. The bases of the first weighting can ensure, for instance, that the system 100 considers blizzard conditions in the user's location before warm-weather fashion trends emerging elsewhere. As another example, the system 100 can consider the appropriate attire for a scheduled business meeting before a user's historical preference for wearing flip-flops.

At step 625, system 100 can perform a second weighting of the user's wardrobe 120 based on aggregate usage data for at least one apparel item 130 by other users meeting a threshold data similarity for geographic location 157, weather forecast 156, and calendar data 158.

This step can be accomplished by receiving aggregated or statistical data tracking a plurality of users' apparel choices from database 111 on the decisions other users have made when confronted with similar circumstances. In an example consistent with one embodiment, if a user has Scarves 1, 2, and 3, and other users have most often chosen Scarf 2 for a similar event in similar weather conditions, then Scarf 2 would be weighted the highest.

At step 630, system 100 can perform a third weighting of the user's wardrobe 120 based on the user's past usage history of the apparel items 130. This step can be accomplished by taking into account historical data from database 111 on the user's fashion habits.

In one example, the system 100 weights specific apparel items more highly when the user has not worn that specific apparel item for a threshold number of days. This can help the user avoid wearing the same apparel too often.

In another example, system 100 may keep extensive data on the number of times, types of events, ambient conditions, times of day, days of week, and seasons where each apparel item 130 is worn, along with other data such as co-worn apparel items 130 and historical input as to outfit acceptability (see steps 560, 570, 580). In accomplishing this step, then, system 100 may weight an apparel item 130 higher that has been chosen more frequently by the user, or that the user has often chosen for this type of occasion (e.g. a favorite necklace often worn by the user when attending an evening formal event in the summertime). However, the system 100 can weight an apparel item lower if it was recently worn to a similar event. This can help a user avoid dressing the same way, for example, multiple weeks in a row at church.

At step 635, system 100 can determine potential matching apparel item combinations 190 (e.g., optimized apparel combinations) based on style and color compatibility of highest-weighted apparel items 130 of multiple types by comparing style and color database information. In an embodiment, system 100 can have the capability of comparing the predominant and/or accent colors of two or more apparel items 130, weighting potential combinations based on color compatibility rules. Such rules can be stored at apparel sever 110 and/or programmed into the application 205, local to user devices 160, centrally stored in the database 111, definable by users, adaptable over time to changing notions of color compatibility, or adaptable via a machine learning process (e.g. a neural net).

For example, application 205 could have a collection of rules (possibly overridable by a user setting choice) that utilize threshold comparisons, as previously described. The comparison can, for example, determine that black and navy clash. Other seasonal color considerations are also possible. For example, the system 100 can negatively weight primary apparel that is predominantly white after Labor Day. The system can also utilize rules that make sure combined accessories do not share a color characteristic. For example, the system can prevent pairing two different bright colors in an outfit for a formal event. The user might also indicate a preference against certain color combinations or a preference to override a system-perceived "clash" that, e.g., reflects the colors of user's alma mater.

The system 100 can store user input regarding matches and clashes in one example. By aggregating user input across large pools of users, the system 100 can better determine which apparel items match and clash with one another.

In an embodiment, system 100 can have the capability of comparing the two or more apparel items 130, weighting potential combinations based on style rules. Similar to color rules, style rules could take many forms, including pre-programmed, user-definable, adaptable, and/or database-derived rules. Such rules can prevent pairing a tie with a short-sleeved shirt, and prevent pairing striped patterns with plaid patterns. System 100 could employ sets of color and style rules, with each with a weight and priority, to weigh potential matching apparel item combinations 190 and arrive at one or more highest-weighted combinations.

At step 640, system 100 can compare potential matching apparel item combinations 190 against historical apparel item combinations of other users. Such a step can be achieved by, for example, finding common pairings of one or more highest-weighted apparel items 130 in the system's 100 aggregated use data. Such a step can also be achieved by comparing whole outfits or subcombinations thereof in the aggregate data to whole outfits or subcombinations thereof being considered in method 600 for recommendation to the user.

At step 645, system 100 can cause the user device 160 to display a first potential matching apparel item combination 190 on the avatar 180 based on a highest combination score. At step 650, system 100 causes the user device 160 to display a second potential matching apparel item combination 190 on the avatar 180 based on a second-highest combination score. Steps 645 and 650 can be accomplished by combining (linearly, further weighted, or otherwise) weights and scores determined in the foregoing steps for each potential apparel item combination 190, and then displaying the top two highest scoring combinations on the user's avatar 180. This can, for example, allow the user to perform "A/B" comparisons of the two outfits determined by system 100 to be the most appropriate matches given the input data.

Figures 6C, 6D:
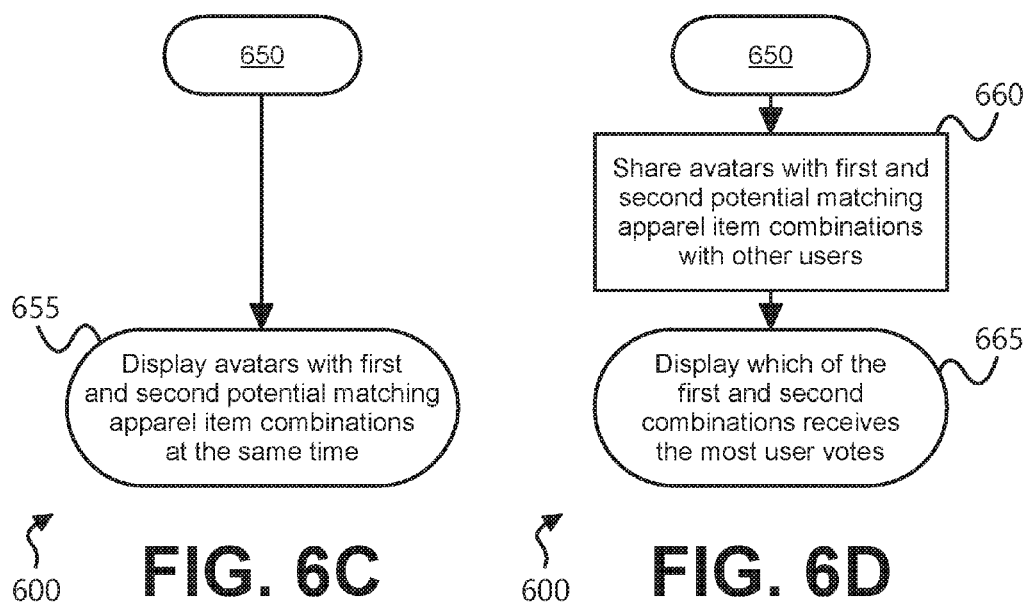
FIG. 6C depicts an exemplary method for using a virtual closet system, in accordance with an embodiment.
FIG. 6D depicts an exemplary method for using a virtual closet system, in accordance with an embodiment.

Referring now to FIG. 6C, there is shown an exemplary method 600 for making an outfit recommendation consistent with an embodiment. At step 650, system 100 can cause a user device 160 to display first and second potential matching apparel item combinations 190 on a user avatar 180.

At step 655, system 100 can cause a user device 160 to display both the first and second potential matching apparel item combinations 190 at the same time. This step can be achieved by, e.g., placing two identical user avatars 180, respectively adorned with the first and second potential matching apparel item combinations 190, side-by-side for the user to visually compare the outfits.

Users can compare multiple avatar images with different apparel item combinations in an example. This feature can be limited on devices but should be solid on home computer or television in an example.

Referring now to FIG. 6D, there is shown an exemplary method 600 for making an outfit recommendation consistent with an embodiment. At step 650, system 100 can cause a user device 160 to display first and second potential matching apparel item combinations 190 on a user avatar 180.

At step 660, system 100 can share the first and second potential matching apparel item combinations 190, as displayed on the user's avatars 180, with other users. This step can be accomplished by, for example, publishing the user's avatars 180 so adorned (or fixed graphical representations thereof) to a user forum within the server 110, to a social media website 151, or directly to other users via a network messaging protocol or other communication channel.

At step 665, system 100 can provide a means for other users to cast votes for either the first or second potential matching apparel item combination 190. System 100 can tally the votes and display which of the two outfits received the most votes. This can allow a user to poll the user base or a subset thereof on which outfit to select out of two potential choices.

In an embodiment, system 100 can display and/or conduct polls about more than two potential matching apparel item combinations 190 at a time.

Figure 7A:
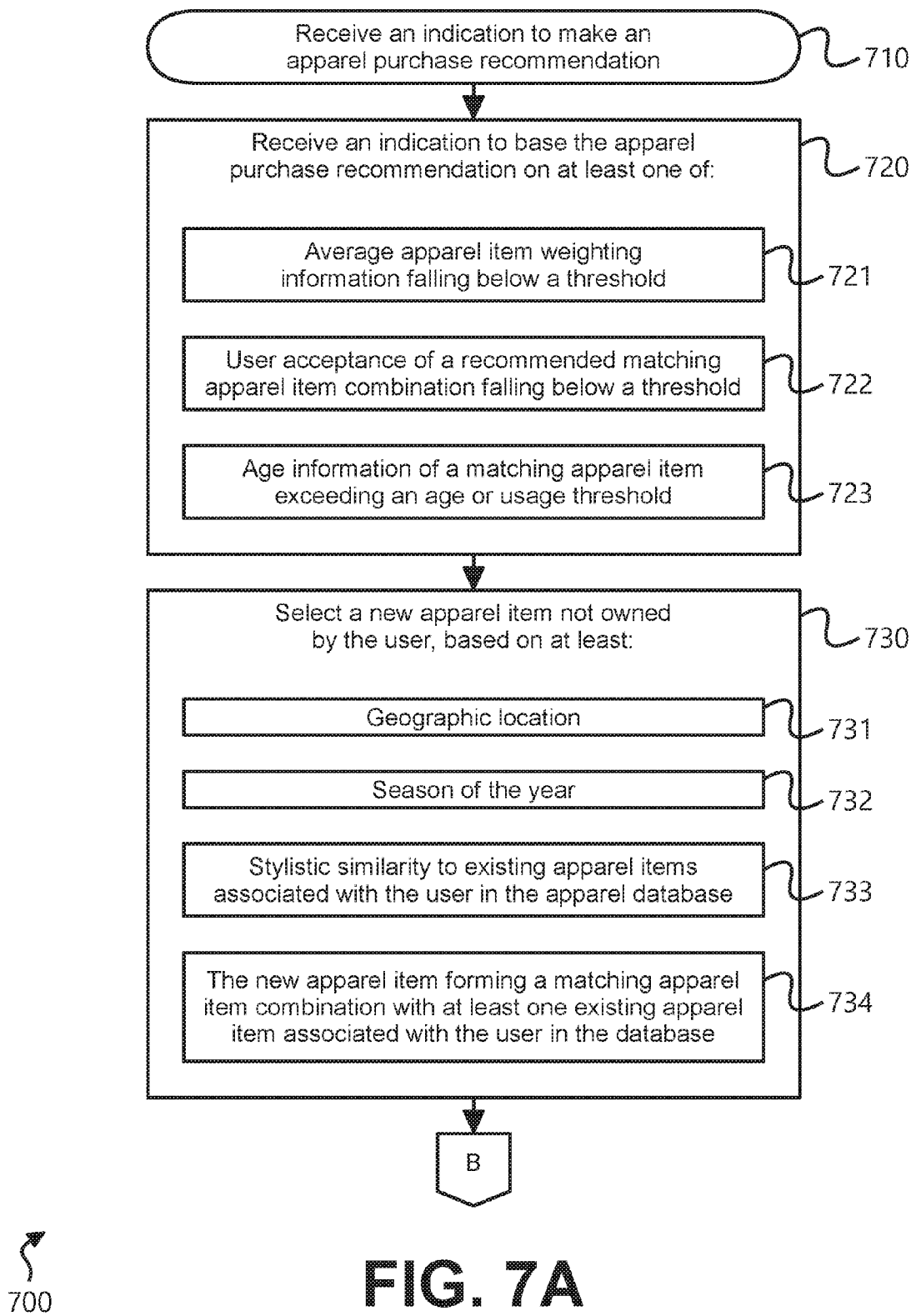
FIG. 7A depicts an exemplary method for using a virtual closet system, in accordance with an embodiment.
Figure 7B:
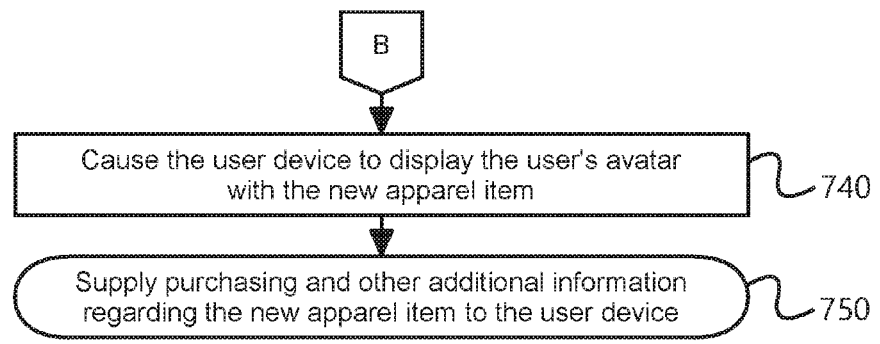
FIG. 7B depicts an exemplary method for using a virtual closet system, in accordance with an embodiment.

Referring now to FIGS. 7A-B, there is shown an exemplary method 700 for making an apparel purchase recommendation consistent with an embodiment.

In an embodiment, system 100 can have the capability to make an apparel purchase recommendation, comprising one or more apparel items 130 that the user does not own or that system 100 determines may be ready for replacement. System 100 may base a purchase recommendation on various data, such as garment age, emerging stylistic or seasonal trends, a user's search or purchase history, or an insufficient quantity of oft-worn articles, climate-appropriate items, or matching/complementary item combinations.

Turning to FIG. 7A, at step 710, the system 100 can receive an indication to make an apparel purchase recommendation. An indication may come from the user explicitly directing the application 205 to make an apparel purchase recommendation. Alternatively, an indication may be triggered or issued from within the application 205 itself, as when, for example, a purchase recommendation is triggered on a calendar date in anticipation of changing seasons, by a one or more apparel items 130 in the user's wardrobe 120 exceeding a threshold age, or by conditions being met for a particular targeted advertisement.

Step 720 can have three subcomponents 721, 722, and 723. At step 720, system 100 can receive an indication to base an apparel purchase recommendation on at least one of: average apparel item weighting information falling below a threshold 721; user acceptance of a recommended matching apparel item combination falling below a threshold 722; or age information of a matching accessory exceeding an age or usage threshold 723.

The first basis 721 may address a projected need for apparel items 130 based on, e.g., seasonal changes, evolving trends, or mismatch between frequency of an activity and quantity of clothing suitable for that activity. For example, in one aspect, system 100 may base a purchasing recommendation on a user's wardrobe 120 falling below a threshold content of popular styles culled from social media 151 and fashion 152 sites. In another aspect, system 100 may base a purchasing recommendation on, e.g., the mismatch between anticipated work days and a relative dearth of dress shirts.

The second basis 722 may address a projected need for apparel items 130 to match with or complement items already in the user's wardrobe 120. For example, system 100 may determine that the user owns three pairs of black dress pants but only casual brown belts, and base a purchasing recommendation of a black dress belt upon that determination.

The third basis 723 may address a projected need for new apparel items 130 to replace aging or frequently worn articles. For example, system 100 may determine that decade-old undergarments might need replacing, or that a user's daily exercise schedule over a long period necessitates new running shoes.

As with other indications, this indication may be user-driven or issued from within the application 205 itself, as when, for example, an indication in step 710 is triggered in anticipation of changing seasons, cascading into a trigger to base the purchase recommendation on at least the first basis 721.

Step 730 can have four subcomponents 731, 732, 733, and 734. At step 730, system 100 can select a new apparel item 130 not owned by the user, based on at least: the user's geographic location 731, the current and upcoming seasons 732, stylistic similarity to existing apparel items 130 in the user's personal apparel database 733 (i.e. clothing in which, by virtue owning similar articles, the user is determined to be interested), and the new apparel item 130 forming a matching apparel item combination 190 with at least one existing apparel item 130 in the user's personal apparel database 734 (i.e. working with the existing clothing a user owns).

At step 740, system 100 causes a user device 160 to display the user avatar 180 wearing a recommended apparel item 130. This step may or may not include further displaying on the avatar 180 a matching apparel item combination 190 that includes additional recommended items and/or items from the database 111.

At step 750, system 100 can supply purchasing and other additional information (e.g. detailed cut, fit, and material information, care instructions, metadata, or categorization tags) regarding the recommended apparel item 130 to the user device 160. This step can be accomplished by, e.g., providing a link to buy at an online retailer, directly interfacing with an online shopping basket, listing locations with the item in stock, or providing pricing data. This step can allow the user to take the next step beyond merely having the article suggested, and actually purchase the item.

Figure 8:
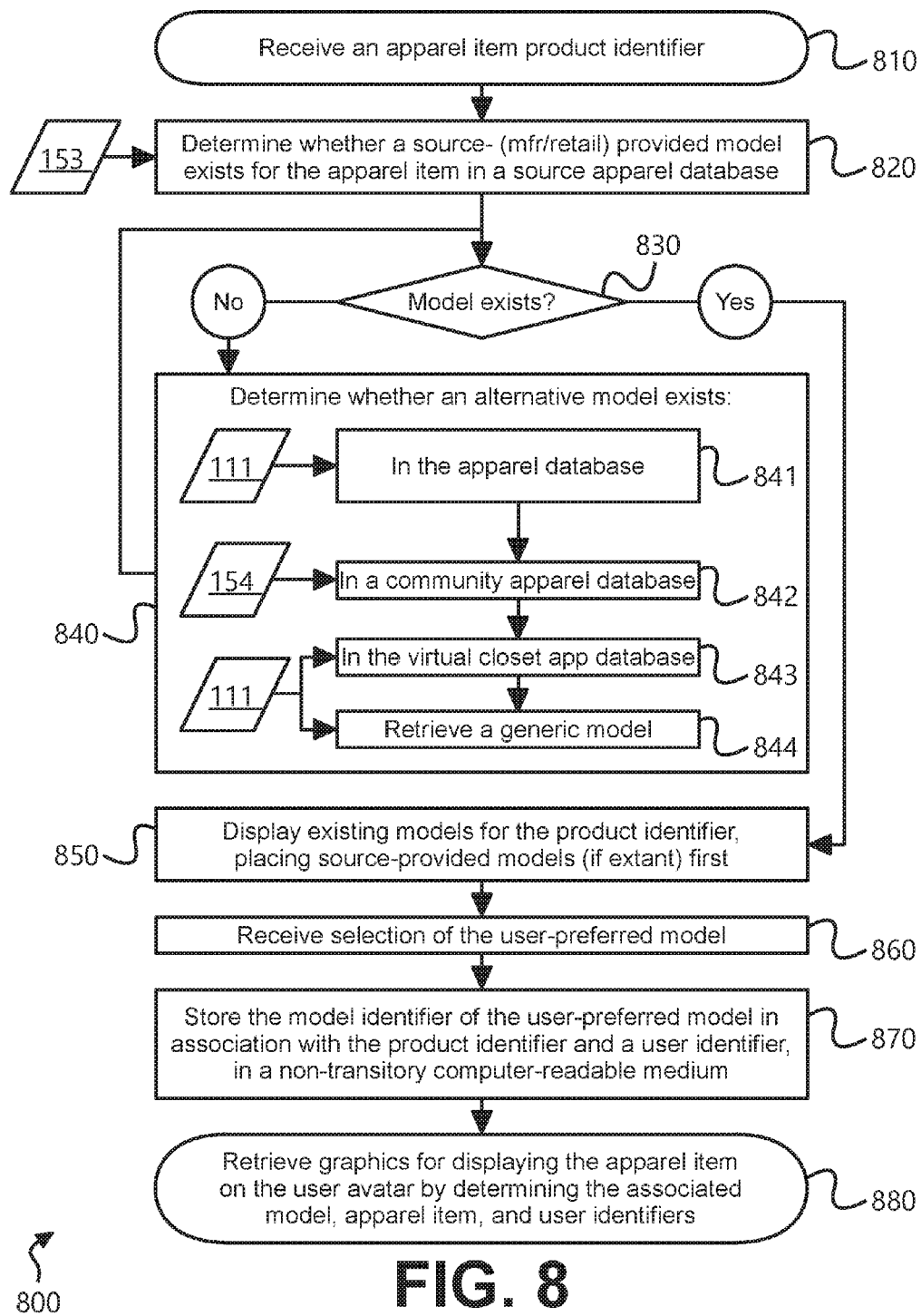
FIG. 8 depicts an exemplary method for using a virtual closet system, in accordance with an embodiment.

Referring now to FIG. 8, there is shown an exemplary method 800 for retrieving a model or graphical representation of an apparel item 130 consistent with an embodiment.

In an embodiment, system 100 can have the capability to associate an apparel item 130 product identifier with one or more models for that item. In one aspect, this can allow system 100 to correlate an apparel item 130 with a visual representation to display on a user device 160. Such a visual representation might be displayed independently, with accompanying text, or on a user avatar 180.

In another aspect, this can allow system 100 to coordinate visual representations of common apparel items 130 across a virtual closet ecosystem. In yet another aspect, this can allow a user to choose (or provide) a preferred visual representation of an apparel item 130. In still another aspect, this can allow system 100 to associate a set of apparel item 130 visual representations with a user.

In an embodiment, system 100 can determine whether a source-provided or alternative model (including a generic model) exists for a given product identifier. System 100 can then display the existing models and allow a user to choose their preferred model for that apparel item 130. System 100 can then display the user's chosen model on the user's avatar 180.

At step 810, system 100 can receive an apparel item 130 identified by product identifier. This can be, for example, a barcode or QR code scanned in by a user, an alphanumeric string, or automatically generated by the system 100 in response to a user action.

At step 820, system 100 can determine whether a source-provided model exists for the apparel item 130 in a source apparel database 153. If so 830, then the system 100 may (but need not necessarily) proceed to step 850. If not 830, or if the system 100 is configured to retrieve more than just the first-discovered model, then the system proceeds to step 840.

Step 840 can have four subcomponents 841, 842, 843, and 844. At step 840, system 100 can determine whether an alternative model exists for the apparel item in data sources that may include the database 111 and a community apparel database 154.

In one embodiment, the system 100 can determine whether a model exists by steps 841, 842, 843, and 844. At step 841, the apparel server 110 can check if a model exists first in the database 111. If not (step 830), then at step 842 the apparel server 110 can check a community apparel/model database 842. If not, then at step 843 the apparel server 110 can check an alternate database 153, such as a retailer database. Finally, the system 100 at step 844 can retrieve a generic model from the database 111 for an apparel item that cannot be more specifically represented. The generic model can be selected from a plurality of generic models based on the style category ratings and color information values of the apparel item. In other embodiments, those steps along with step 820 may occur in a different order, simultaneously, or may involve checking more or fewer data sources.

At step 850, system 100 can display existing models associated with the product identifier on a user device 160, placing source-provided models (if they exist) first. This can allow a user to visually compare existing models and select a preferred representation for an apparel item 130.

At step 860, system 100 can receive the user's selection of a preferred model. At step 870, system 100 stores the model identifier of the user-preferred model in association with the product identifier and a user identifier in a non-transitory computer-readable medium. This can be accomplished by, e.g. storing the identifiers and associated data in a storage module 340 or database 350 (locally on a user device 160 or remotely on server 110), or by associating the identifiers with each other in the tables of a relational database.

At step 880, system 100 can retrieve graphics for displaying the apparel item 130 on the user avatar 180 by determining the associated model, apparel item, and user identifiers.

It should be appreciated that in any method or step wherein system 100, server 110, or any other component, "receives" information, such receipt may be satisfied by such information being: transmitted over a communication network to, or received by, interface 370; read from storage system 340 or database 350; accessed in RAM 320 or ROM 330; or, input into I/O module 360.

Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A non-transitory, computer-readable medium containing instructions executed by at least one processor to perform stages for avatar-based apparel decisions, the stages comprising:
    storing, in a database, apparel data for a plurality of apparel items, the apparel data including size information of the apparel items and usage information for a plurality of users;
    sizing an avatar for a first user among the plurality of users based on at least one of:
        a picture of a user in relation to a reference object; and
        the size information for a first subset of the apparel items associated with the first user based on the usage information of each of the first subset of apparel items;
    scoring relationships between apparel items by a backend process based on the usage information;
    determining a first apparel item to display on the avatar based on the scored relationships and the usage information for the first user;
    displaying, on the user device, the first apparel item on the sized avatar;
    receiving a selection from the first user for an outfit recommendation;
    determining a geographic location of the first user;
    receiving weather forecast information at the geographic location;
    receiving calendar information for the user, the calendar information including an event type;
    performing a first weighting for the scored plurality of apparel items based on the geographic location, weather forecast, and event type;
    performing a second weighting for the plurality of apparel items based on past usage history of the scored plurality of apparel items by the first user;
    determining a highest weighted primary apparel item;
    determining a highest weighted complementary apparel item, based at least in part on a score of the complementary apparel item receiving additional weighting based on style and color compatibility with the highest weighted apparel item; and
    display a first optimal apparel combination on the avatar, the first optimal apparel combination including the highest weighted primary apparel item and highest weighted complementary apparel item, wherein the first apparel item is the primary apparel item.

2. The non-transitory, computer-readable medium of claim 1, wherein determining the first apparel item to display includes:
    receiving selection of a second apparel item by the first user;
    determining a match candidate for the second apparel item based on the first user's geographic location and usage information for the first user's apparel items having a compatible type to the second apparel item, wherein the match candidate is the first apparel item.

3. The non-transitory, computer-readable medium of claim 2, wherein the first apparel item is chosen from apparel items that have not yet been owned by the first user, and wherein the stages further include
    providing a link to a purchase location for the first apparel item for selection by the first user.

4. The non-transitory, computer-readable medium of claim 2, wherein the first apparel item is chosen from apparel items that are owned by the first user, and at least one of the owned apparel items is eliminated from selection based on recency of usage.

5. The non-transitory, computer-readable medium of claim 1, wherein the first subset of apparel items are apparel items purchased by the first user.

6. The non-transitory, computer-readable medium of claim 1, wherein determining the first apparel item to display includes weighting each of the first subset of apparel items based on a weather forecast at a geographic location of the first user, a calendar event associated with the first user, and a most recent date of usage for each of the apparel items in the subset.

7. The non-transitory, computer-readable medium of claim 1, wherein using the size information for the first subset of apparel items to size the avatar includes:
    determining leg length data based on an average leg length of at least two apparel items worn by the first user within a recency threshold, the at least two apparel items being a pants type of apparel;
    determining a waist size based on averaging waist size of the at least two apparel items; and
    choosing a height and waist size of the avatar based on the determined leg length and waist size.

8. The non-transitory, computer-readable medium of claim 1, the stages further comprising:
    receiving an image of the first user on a user device;
    storing the image in association with the avatar; and
    wherein displaying the avatar includes displaying a portion of the image on the avatar and superimposing onto the avatar at least the image a rendering of the first apparel item.

9. The non-transitory, computer-readable medium of claim 1, wherein the score of the highest weighted complementary apparel item is determined by the backend process prior to the weighting and is relative to the highest weighted primary apparel item.

10. The non-transitory, computer-readable medium of claim 9, further including displaying a second optimal apparel combination on a second avatar and contemporaneously with the first optimal apparel combination being displayed on the first avatar.

11. The non-transitory, computer-readable medium of claim 10, wherein the first and second avatars are shared on a social network for soliciting input from the at least one other user.

12. The non-transitory, computer-readable medium of claim 1, wherein the stages further include recommending a new apparel item in addition to the first apparel item based on at least one of:
the user declining the first apparel item; and
age information of the first apparel item exceeding an age threshold;
wherein the new apparel item is selected based on a highest scored apparel item not yet owned by the user, wherein the scoring by the backend process is based at least in part on users having worn the highest scored apparel item together with apparel items that are owned by the first user.

13. The non-transitory, computer-readable medium of claim 12, wherein the scoring by the backend process further includes:
weighting apparel items differently for different geographic regions; and
weighting apparel items differently for different seasons of the year.

14. A method for avatar-based apparel decisions, including:
storing, in a database, apparel data for a plurality of apparel items, the apparel data including size information of the apparel items and usage information for a plurality of users;
sizing an avatar for a first user among the plurality of users based on at least one of:
a picture of a user in relation to a reference object; and
the size information for a first subset of the apparel items associated with the first user based on the usage information of each of the first subset of apparel items;
scoring relationships between apparel items by a backend process based on the usage information;
determining a first apparel item to display on the avatar based on the scored relationships and the usage information for the first user;
displaying, on the user device, the first apparel item on the sized avatar;
receiving a selection from the first user for an outfit recommendation;
determining a geographic location of the first user;
receiving weather forecast information at the geographic location;
receiving calendar information for the user, the calendar information including an event type;
performing a first weighting for the scored plurality of apparel items based on the geographic location, weather forecast, and event type;
performing a second weighting for the plurality of apparel items based on past usage history of the scored plurality of apparel items by the first user;
determining a highest weighted primary apparel item;
determining a highest weighted complementary apparel item, based at least in part on a score of the complementary apparel item receiving additional weighting based on style and color compatibility with the highest weighted apparel item; and
display a first optimal apparel combination on the avatar, the first optimal apparel combination including the highest weighted primary apparel item and highest weighted complementary apparel item, wherein the first apparel item is the primary apparel item.

15. The method of claim 14, wherein the stages further include recommending a new apparel item in addition to the first apparel item based on at least one of:
the user declining the first apparel item; and
age information of the first apparel item exceeding an age threshold;
wherein the new apparel item is selected based on a highest scored apparel item not yet owned by the user, wherein the scoring by the backend process is based at least in part on users having worn the highest scored apparel item together with apparel items that are owned by the first user.

16. The method of claim 15, wherein the scoring by the backend process further includes:
weighting apparel items differently for different geographic regions; and
weighting apparel items differently for different seasons of the year.

17. A system for avatar-based apparel decisions, including:
a database that includes a non-transitory computer-readable storage medium that stores apparel data for a plurality of apparel items, the apparel data including size information of the apparel items and usage information for a plurality of users;
a server including a hardware processor that executes a backend process that scores relationships between apparel items based on the usage information;
a computing device that executes a front-end application, the front-end application performing stages including:
sizing an avatar for a first user among the plurality of users based on at least one of:
a picture of a user in relation to a reference object; and
the size information for a first subset of the apparel items associated with the first user based on the usage information of each of the first subset of apparel items; and
determining a first apparel item to display on the avatar based on the scored relationships and the usage information for the first user;
displaying, on the computing device, the first apparel item on the sized avatar;
reporting, to the server, the first user's acceptance or denial of the first apparel item;
receiving a selection from the first user for an outfit recommendation;
determining a geographic location of the first user;
receiving weather forecast information at the geographic location;
receiving calendar information for the user, the calendar information including an event type;
performing a first weighting for the scored plurality of apparel items based on the geographic location, weather forecast, and event type;
performing a second weighting for the plurality of apparel items based on past usage history of the scored plurality of apparel items by the first user;
determining a highest weighted primary apparel item;
determining a highest weighted complementary apparel item, based at least in part on a score of the complementary apparel item receiving additional weighting based on style and color compatibility with the highest weighted apparel item; and display a first optimal apparel combination on the avatar, the first optimal apparel combination including the highest weighted primary apparel item and highest weighted complementary apparel item, wherein the first apparel item is the primary apparel item.

18. The system of claim 17, wherein the front-end application performs further stages including:
sending at least one apparel combination including the first apparel item to a second user for feedback;
displaying the feedback on the computing device; and
wherein the feedback is sent to the server for use in the scoring.

19. The system of claim 17, wherein the front-end application performs further stages including:
receiving an apparel recommendation from the server, the apparel recommendation including a second apparel item not owned by the first user, the recommendation being based on the second apparel item having a scored relationship with the first apparel item that exceeds a threshold, the scored relationship being based on usage of the first and second apparel items together by other users.

\* \* \* \* \*